United States Patent
Lüke

(10) Patent No.: US 8,065,058 B2
(45) Date of Patent: Nov. 22, 2011

(54) METHOD FOR GUIDING A VEHICLE INTO A PARKING SPACE AND PARKING ASSISTANCE DEVICE

(75) Inventor: Stefan Lüke, Olpe (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 1037 days.

(21) Appl. No.: 11/793,989

(22) PCT Filed: Dec. 22, 2005

(86) PCT No.: PCT/EP2005/057135
§ 371 (c)(1),
(2), (4) Date: Nov. 19, 2007

(87) PCT Pub. No.: WO2006/069976
PCT Pub. Date: Jul. 6, 2006

(65) Prior Publication Data
US 2008/0125939 A1  May 29, 2008

(30) Foreign Application Priority Data

Dec. 24, 2004 (DE) .......................... 10 2004 062 549
Dec. 22, 2005 (DE) .......................... 10 2005 062 084

(51) Int. Cl.
*B62D 6/00* (2006.01)
*B60Q 1/48* (2006.01)
(52) U.S. Cl. .......... 701/41; 701/42; 340/932.2; 180/199

(58) Field of Classification Search .................. 180/199; 701/41, 42, 301; 340/932.2
See application file for complete search history.

(56) References Cited

U.S. PATENT DOCUMENTS

| | | | | |
|---|---|---|---|---|
| 5,742,141 A * | 4/1998 | Czekaj | ........................... | 318/587 |
| 6,070,684 A | 6/2000 | Shimizu et al. | | |
| 6,483,442 B2 * | 11/2002 | Shimizu et al. | ............ | 340/932.2 |
| 6,950,035 B2 * | 9/2005 | Tanaka et al. | ............... | 340/932.2 |
| 7,602,312 B2 * | 10/2009 | Danz et al. | .................. | 340/932.2 |
| 2006/0190147 A1 * | 8/2006 | Lee et al. | ......................... | 701/26 |

FOREIGN PATENT DOCUMENTS

| | | |
|---|---|---|
| DE | 19922173 | 11/1999 |
| DE | 19940007 | 3/2001 |
| EP | 0931712 | 7/1999 |
| EP | 1491430 | 12/2004 |
| EP | 1602560 | 12/2005 |
| WO | 2005085043 | 9/2005 |

* cited by examiner

Primary Examiner — Tony H. Winner
Assistant Examiner — Marc Scharich

(57) ABSTRACT

Disclosed is a method for steering a vehicle to be parked in reverse into a parking gap where a nominal parking trajectory of the vehicle is determined by a control unit and where a steering angle of the steered wheels of the vehicle that must be set for negotiating the parking gap is determined on the basis of the nominal parking trajectory. The nominal parking trajectory ($y_B(x)$) is determined on the basis of a position of the vehicle from two reference trajectories ($y_{Lower}(x)$; $y_{Upper}(x)$), and the reference trajectories ($y_{Lower}(x)$; $y_{Upper}(x)$) represent parking trajectories for parking, starting from different start points.

30 Claims, 3 Drawing Sheets

METHOD FOR GUIDING A VEHICLE INTO A PARKING SPACE AND PARKING ASSISTANCE DEVICE

This application is the U.S. national phase of international application PCT/EP05/57135 filed Dec. 22, 2005, which designated the U.S. and which claims the benefit of priority of German Patent Application Number 10 2005 062 084.1 filed Dec. 22, 2005 and German Patent Application Number 10 2004 062 549.2 filed Dec. 24, 2004. The contents of each of the aforementioned documents are incorporated herein in their entirety.

BACKGROUND OF THE INVENTION

The invention relates to a method for steering a vehicle to be parked in reverse into a parking gap, involving a control unit determining a nominal vehicle parking trajectory and determining a steering angle of steered wheels of the vehicle to be set for approaching and reaching the parking gap on the basis of the nominal parking trajectory.

Moreover, the invention relates to a parking assist device suitable for applying the method.

A known method is to control vehicles automatically along a nominal trajectory into a parking gap detected beforehand by means of environment sensors. The nominal trajectory is normally preset in the form of polynomials or as a sequence of circular arcs and clothoid arcs, as disclosed for instance in German publication DE 199 400 07 A1.

Conventionally, the parameters of the nominal trajectory foreseen are computed starting from the start point. In general, this requires very complex computations in order—for instance on the basis of a high-level polynomial—to determine the nominal trajectory in such a manner as to ensure convenient approach to and reaching of the parking gap. The disadvantage here is that very complex and powerful computing units need to be used in vehicles to compute a convenient nominal trajectory. Therefore, one object of the invention is to reduce the computing complexity for determining the nominal trajectory for parking a vehicle.

SUMMARY OF THE INVENTION

According to the invention, this object is achieved by a method for steering a vehicle to be parked in reverse into a parking gap in which a nominal parking trajectory of the vehicle is determined by a control unit and a steering angle of steered wheels of the vehicle that can be set for negotiating the parking gap is determined on the basis of the nominal parking trajectory. The nominal parking trajectory ($y_B(x)$) is determined from two reference trajectories ($y_{Lower}(x)$; $y_{Upper}(x)$) on the basis of a position of the vehicle, wherein the reference trajectories ($y_{Lower}(x)$; $y_{Upper}(x)$) represent parking trajectories for parking, starting from different start points. The object is also achieved by a parking assist device for steering a vehicle to be parked in reverse into a parking gap, comprising a control unit with which a nominal parking trajectory of the vehicle and a steering angle of steered wheels of the vehicle that must be set for negotiating the parking gap can be determined. The nominal parking trajectory ($y_B(x)$) can be determined on the basis of a position of the vehicle from two reference trajectories ($y_{Lower}(x)$; $y_{Upper}(x)$) wherein the reference trajectories ($y_{Lower}(x)$; $y_{Upper}(x)$) represent parking trajectories for parking, starting from different start points.

In accordance with this, it is foreseen that a method of the type described at the start be performed in such a manner that the nominal parking trajectory be determined from at least two reference trajectories, on the basis of a position of the vehicle, wherein the reference trajectories are parking trajectories containing different vehicle start points.

Moreover, the invention foresees an embodiment of a parking assist device for steering a vehicle to be parked in reverse into a parking gap, comprising a control unit with which a nominal parking trajectory of the vehicle and a steering angle of steered wheels of the vehicle that can be set for approaching and reaching the parking gap can be determined so that the nominal parking trajectory can be determined from two reference trajectories, on the basis of a position of the vehicle, wherein the reference trajectories represent parking trajectories for parking, starting from different start points.

Consequently, the invention includes the idea of determining the nominal parking trajectory on which the vehicle or a preset reference point of the vehicle is steered into the parking gap on the basis of two reference trajectories. Consequently, the parking trajectory does not need to be re-computed entirely each time the vehicle is parked. Rather, the same reference trajectories can be used each time the vehicle is parked. These reference trajectories are combined in accordance with the available conditions, such as the available position of the vehicle in particular, to form a nominal parking trajectory for the parking maneuver. This substantially reduces the computing complexity for computing the parking trajectory.

The term "a position of the vehicle" means, in particular, the position of a preset reference point of the vehicle within the framework of the invention.

In one particularly advantageous embodiment of the method pursuant to the invention and the parking assist device according to the invention, it is foreseen that the reference trajectories correspond to parking trajectories containing start points with different lateral distances from the parking gap.

The term "lateral distance of a point from the parking gap" means the distance between the point and the parking gap, measured transverse to the parking gap.

One practicable embodiment of the method pursuant to the present invention and of the unit pursuant to the invention is characterised by determining the nominal parking trajectory from the reference trajectories in such a manner that a point of the nominal parking trajectory corresponds to the position of a pre-set reference point of the vehicle.

One other particularly advantageous embodiment of the method according to the present invention and of the unit pursuant to the invention foresees saving the reference trajectories in the control unit.

In order to minimise the required memory demand, a particularly advantageous further development of the method pursuant to the invention and the parking assist device pursuant to the invention foresees saving the reference trajectories referred to parking in a parking gap with the minimum possible longitudinal extent for approaching and reaching the parking gap in the control unit and adapting at least one reference trajectory to the available parking gap.

This minimises the memory demand for saving the reference trajectories in the control unit since only the reference trajectories referred to the parking gap with the smallest longitudinal extent adequate for approaching and reaching the parking gap need to be saved.

One practicable embodiment of the method according to the invention and the parking assist device pursuant to the invention is characterised by that the adaptation is done using a scaling factor by stretching the reference trajectory in the direction of the longitudinal extent of the parking gap.

One advantageous further development of the method according to the invention and the parking assist device pursuant to the invention is characterised by determining the scaling factor from a ratio of longitudinal extent of the available parking gap to the longitudinal extent of the parking gap with the minimum longitudinal extent for approaching and reaching the parking gap.

One equally advantageous further development of the method pursuant to the invention and the parking assist device according to the invention foresees presetting the scaling factor as a function of the longitudinal extent of the available parking gap.

Moreover, one advantageous embodiment of the method pursuant to the invention and the parking assist device pursuant to the invention is characterised by adopting the reference trajectory that contains the start point with the largest lateral distance with respect to the parking gap without stretching while the other reference trajectories are adapted using the scaling factor by stretching to the available parking gap.

One preferred further development of the method pursuant to the invention and the parking assist device pursuant to the invention foresees determining the nominal parking trajectory by addition of the reference trajectories each multiplied by a factor.

One particularly preferred embodiment of the method according to the present invention and the parking assist device pursuant to the invention is characterised by computing the nominal parking trajectory $y_B(x)$ in the form $$y_B(x) = F \cdot y_{Upper}(x) + (1-F) \cdot y_{Lower}(x)$$

from a first reference trajectory $y_{Upper}(x)$ and a second reference trajectory $y_{Lower}(x)$ wherein x is a coordinate on a coordinate axis aligned in longitudinal direction of the parking gap and F is an interpolation factor.

The y coordinate is a coordinate on the coordinate axis trans-verse to the parking gap.

Consequently, the nominal parking trajectory is determined in an advantageous manner by an interpolation method on the basis of the reference trajectories.

Moreover, one advantageous embodiment of the method pursuant to the invention and the parking assist device according to the invention is characterised by the reference trajectories comprising several sections, wherein the last four sections in travel direction are a clothoid section, a circular arc section, a further clothoid section and a further circular arc section.

The term "travel direction" in this case means the direction in which the vehicle is steered, starting from the start position, into the parking gap.

A nominal parking trajectory ensuring a particularly convenient parking maneuver, without excessively high maximum steering angles and steering speeds, can be determined on the basis of reference trajectories featuring trajectory sections of this type. In particular, such reference trajectories allow the avoidance of steering angle changes, which require stopping the vehicle during parking when following the nominal parking trajectory.

One practicable embodiment of the method according to the invention and the parking assist device pursuant to the invention is also characterised by reference trajectories comprising five sections, wherein the first section in the travel direction is a straight section.

One preferred embodiment of the method according to the invention and the parking assist device pursuant to the invention foresees the assignment of points of the nominal parking trajectory to a nominal vehicle yaw angle in each case.

One embodiment of the method according to the present invention and the control unit pursuant to the invention provides in an advantageous manner for one yaw angle being saved in the control unit for each point of the reference trajectories and the nominal yaw angle that is assigned to the nominal parking trajectory being determined from the yaw angles that are saved with regard to the points of the reference trajectories.

One further preferred embodiment of the method according to pre-sent the invention and the parking assist device pursuant to the invention foresees one nominal steering angle being assigned to each of the points of the nominal parking trajectory.

What is advantageous in one embodiment of the method according to the invention and the control unit pursuant to the invention is that it is foreseen that one steering angle be saved in the control unit for each point of the reference trajectories and that the nominal steering angle that is assigned to the nominal parking trajectory be determined from the steering angles that are saved with regard to the points of the reference trajectories.

Moreover, one preferred embodiment of the method pursuant to the invention and the parking assist device pursuant to the invention is characterised by that the steering angle to be set for approaching and reaching the parking gap in the control unit is determined on the basis of a pilot control function wherein a share of the steering angle is determined on the basis of the pilot control function as a function of a point of the nominal parking trajectory following the actual position of the vehicle on the nominal parking trajectory after a given distance and the nominal yaw angle assigned to this point.

The pilot control function allows the vehicle to be steered particularly conveniently by the driver during the parking maneuver without phase lag.

What is advantageous in one embodiment of the method according to the present invention and the parking assist device pursuant to the invention is that it is foreseen that the pilot control function is combined with a position control, wherein a share of the steering angle to be set for approaching and reaching the parking gap be determined as a function of the deviation between the actual position of the vehicle and the nominal parking trajectory.

Such a position control allows possible inaccuracies in pilot control to be corrected.

Moreover, in another advantageous embodiment of the invention it is foreseen that the pilot control function is combined with a yaw angle control, wherein a share of the steering angle is determined as a function of a deviation between the actual yaw angle of the vehicle and the nominal yaw angle that is assigned to a point of the nominal parking trajectory adjoining the actual position of the vehicle.

Such a yaw angle control also allows possible inaccuracies in pilot control to be corrected.

In general, the values of the state variables of the vehicle, in particular the values of the yaw angle and the steering angle, set in a start position selected by the driver for the parking maneuver, do not correspond to the values preset for the nominal parking trajectory, so that the vehicle cannot, in general, be steered into the parking gap on a nominal parking trajectory determined on the basis of the start position.

The state variables of the vehicle must consequently be adapted to the state variables preset for a nominal parking trajectory. This is done preferably by means of a controller without having to stop the vehicle so as to ensure convenient parking.

One preferred embodiment of the method according to the invention and the parking assist device pursuant to the invention foresees steering the vehicle initially on the basis of an anticipatory control function onto the nominal parking trajectory, starting from a start point, and then performing the pilot control function afterwards, for this purpose.

Thus, an anticipatory controller is used in an advantageous manner for aligning the vehicle with one possible nominal parking trajectory.

One advantageous embodiment of the method according to the pre-sent invention and the parking assist device pursuant to the invention foresees determining the steering angle to be set for approaching and reaching the parking gap by means of the control unit on the basis of an anticipatory control function as a function of a deviation between an anticipated vehicle position after negotiating a given distance on the basis of an actual position of the vehicle, assuming a constant steering angle during negotiation of the distance, and a provisional nominal parking trajectory.

Owing to such an anticipatory control function, the control response largely corresponds to that of the driver. This means that the driver can easily comprehend vehicle steering during the parking maneuver, consequently enhancing convenience still further for the driver.

One advantageous embodiment of the method according to the invention and the parking assist device pursuant to the invention is characterised by the deviation corresponding to a distance measured in transverse direction with respect to the parking gap between the anticipated position of the given reference point of the vehicle and the nominal parking trajectory.

One practicable embodiment of the method according to the invention and the parking assist device pursuant to the invention foresees determining the provisional nominal parking trajectory on the basis of the actual position of the vehicle from the reference trajectories.

One advantageous embodiment of the method pursuant to the invention and the parking assist device according to the invention also foresees determining the steering angle $\delta_{Nominal}$, to be set for approaching and reaching the parking gap on the basis of the anticipatory control function by means of the relationship $$\epsilon_{Nominal} = K_{Preview} \cdot \int \Delta Y \cdot dt$$

wherein $K_{Preview}$ describes a gain, $\Delta Y$ describes the distance between the anticipated position of the preset reference point (A) of the vehicle (1) and the provisional nominal parking trajectory ($y_B(x)$), measured in transverse direction with respect to the parking gap (9) and t describes a time variable.

Such a control law allows the avoidance of a permanent control deviation, therefore representing an advantage.

One advantageous further development of the method according to the invention and the parking assist device pursuant to the invention is characterised by the control unit operating clockwise and determining a nominal parking trajectory in each clocking step pursuant to the current actual position of the vehicle from the reference trajectories.

In one embodiment of the method pursuant to the invention and the parking assist device pursuant to the invention it is foreseen in an advantageous manner that the pilot control function be run after it has been established that the magnitude of the deviation between the anticipated position of the vehicle after negotiating the given distance and the provisional nominal parking trajectory is lower than a given threshold value.

Moreover, one advantageous embodiment of the method according to the invention and the parking assist device pursuant to the invention foresees running the pilot control function after it has been established that the magnitude of the deviation between the anticipated yaw angle of the vehicle after negotiating the given distance and a nominal yaw angle that is assigned to a point of the provisional nominal parking trajectory adjacent to the anticipated position of the vehicle after negotiating the given distance is lower than a preset threshold value.

One further embodiment of the method according to the invention and the parking assist device pursuant to the invention foresees running the pilot control function after it has been determined in the control unit that the magnitude of the deviation between the actual steering angle of the vehicle and a nominal steering angle that is assigned to a point of the provisional nominal parking trajectory adjacent to the position of the vehicle anticipated after negotiating the given distance is lower than a preset threshold value.

In addition, one particularly advantageous embodiment of the method pursuant to the invention and the parking assist device pursuant to the invention is characterised by the nominal parking trajectory corresponding to the provisional nominal parking trajectory determined directly before switching over to the pilot control function.

Advantageous embodiments of the invention consequently include the idea of steering the vehicle onto a nominal parking trajectory on the basis of the anticipatory control with a preset yaw angle and a preset steering angle and subsequently running a pilot control function thus steering the vehicle on this nominal parking trajectory into the parking gap. For this purpose, successive, provisional nominal parking trajectories are determined within the framework of anticipatory control. The actual nominal parking trajectory in this case corresponds to the provisional nominal parking trajectory for which only slight anticipated deviations between the nominal yaw angle and the yaw angle of the vehicle and between the nominal steering angle and the steering angle on the steered wheels of the vehicle are determined, besides a low, anticipated position deviation. Consequently, the vehicle is steered onto a nominal parking trajectory with "appropriate" yaw and steering angle, on the basis of the anticipatory control function.

Other advantages, special features and practicable further developments of the invention result from the following illustration of preferred embodiments on the basis of the figures.

DETAILED DESCRIPTION OF THE DRAWINGS

Figure 1:
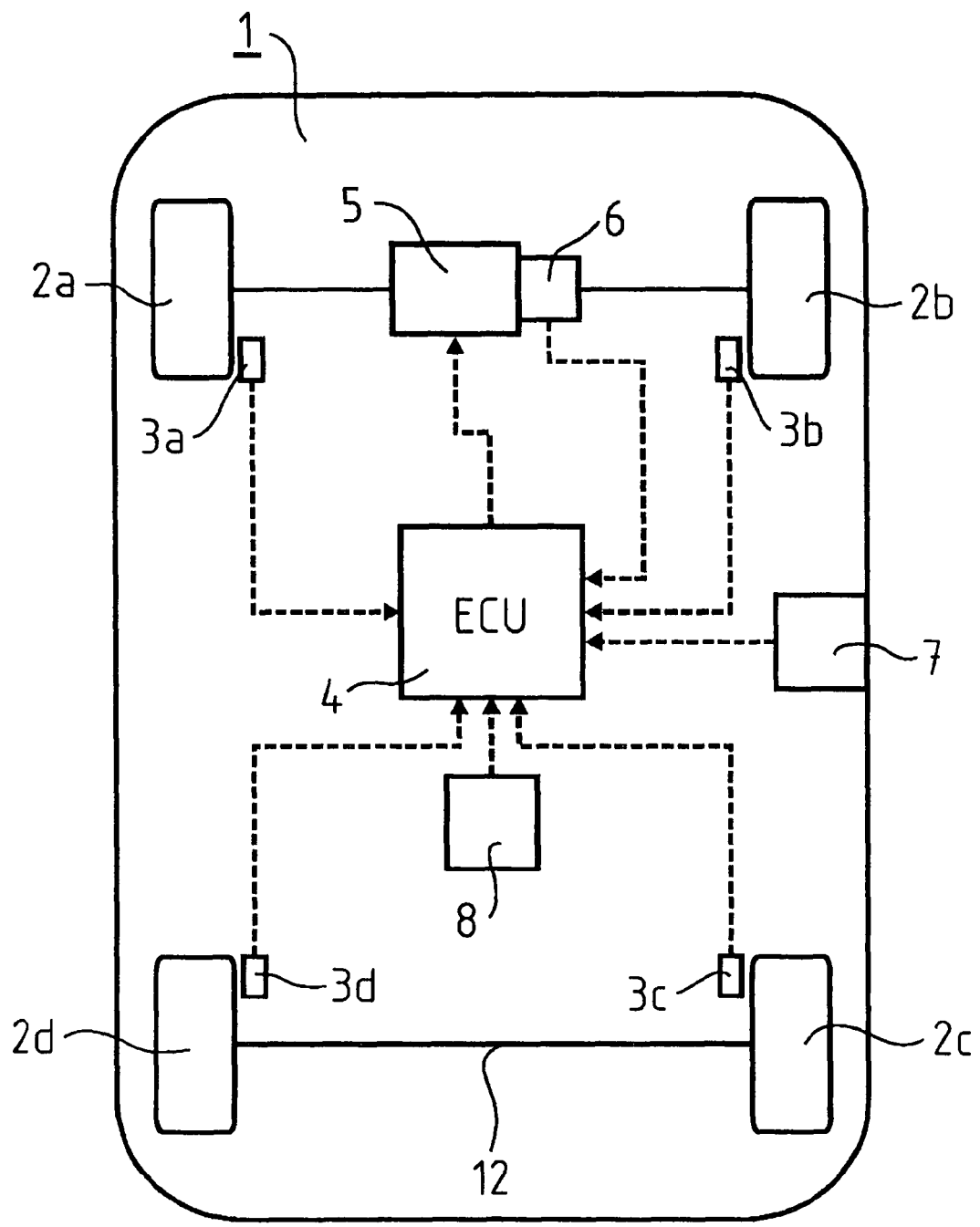
FIG. 1 a schematic representation of a motor vehicle suitable for implementing the invention.

The motor vehicle shown schematically in FIG. 1, referred to as a whole with reference number 1, is provided with four wheels $2a, \ldots, 2d$, to each of which one wheel speed sensor $3a, \ldots, 3d$ is assigned, the signals of this sensor being connected to a control unit (ECU) 4. The vehicle 1 features at least two steered wheels that are the front wheels $2a$, $2b$ in the embodiment of the invention shown. The front wheels $2a$, $2b$ are connected via a steering line to a steering actuator element that is not shown in FIG. 1 and with which the driver of the vehicle 1 is able to set a steering angle on the front wheels $2a$, 2*b*. Moreover, the steering line preferably contains an electromechanical adjusting device 5 that also allows a steering angle or a steering torque that can be felt by the driver to be set independently of the driver's preset. The control commands for setting the steering angle or the steering torque are sent by the control unit 4 to the adjusting device 5. Hereinafter, it is assumed, by way of example, that the adjusting device 5 is a steering angle adjusting device that receives and converts control commands for setting a steering angle $\delta_{Nominal}$ from the control unit 4.

The steering line contains a steering angle sensor 6 whose signals are connected to the control unit 4 for measurement of the steering angle 6 at the front wheels 2*a*, 2*b*. On the basis of the signals of the wheel speed sensors 3*a*, . . .,3*d*, the control unit 4 is able to determine, in particular, the distance that the vehicle 1 has travelled, starting from a specific point. The direction of vehicle movement can be determined on the basis of the signal of the steering angle sensor 6. Consequently, each current position of the vehicle relative to a reference point, such as the corner point of a parking gap, can be determined.

Figure 2:
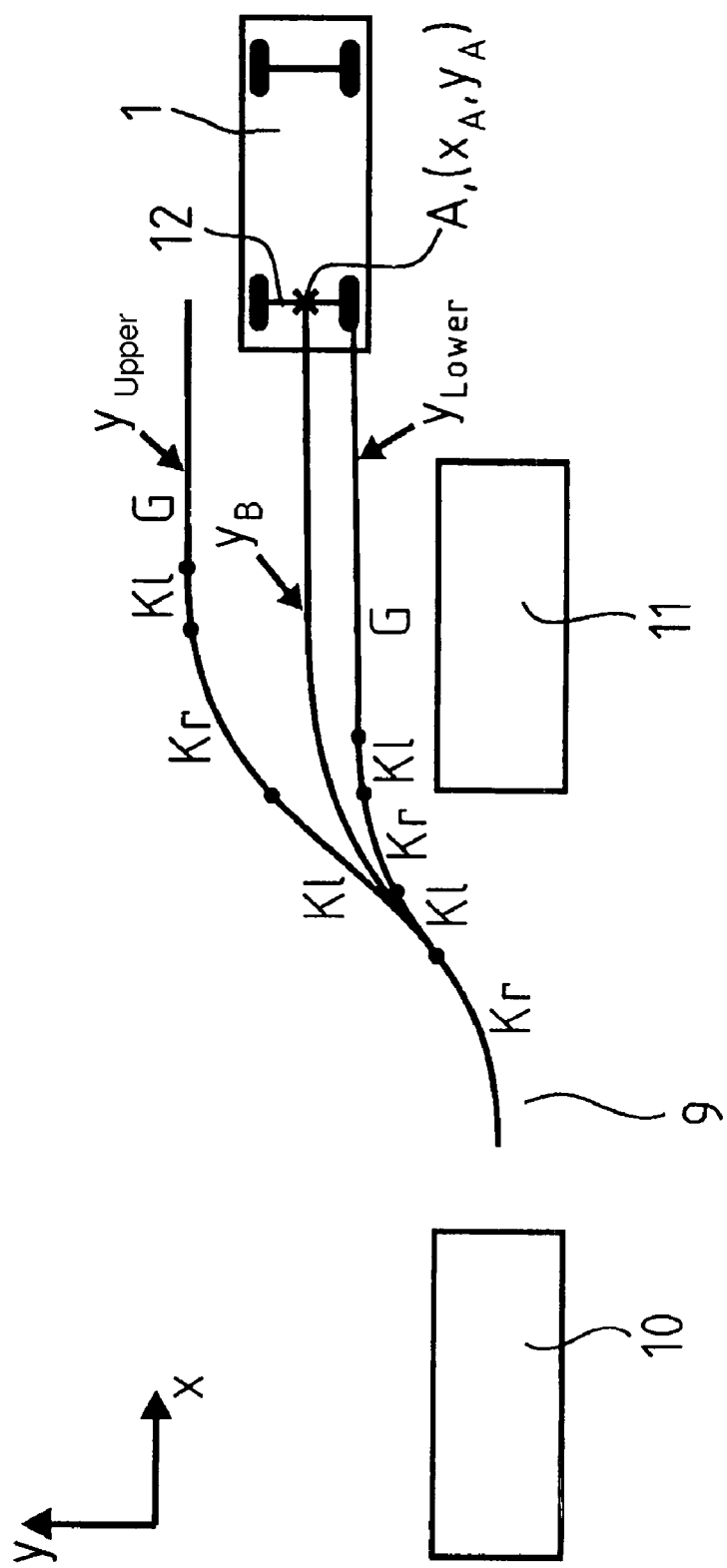
FIG. 2 a schematic representation of a nominal parking trajectory for a parking maneuver and two reference trajectories on the basis of which the nominal parking trajectory is determined within the framework of the invention.

Moreover, the yaw angle θ of the vehicle can be determined from the wheel speed signal and the steering angle signal, wherein the term "yaw angle θ" in this case means the angle between the vehicle longitudinal axis and the longitudinal axis of the parking gap to be approached and reached, i.e. the x axis of the coordinate system shown in FIG. 2.

Optionally, the vehicle 1, in one embodiment of the present invention, may also feature a yaw rate sensor 8 or a yaw angle sensor whose signals are connected to the control unit 4. These sensors can be used in this case for checking the yaw angle θ of the vehicle 1 or for checking the plausibility of the yaw angle θ of the vehicle 1, computed from the wheel speed and steering angle signals.

Moreover, the vehicle 1 features at least one environment sensor 7 whose signals are connected to the control unit 4, used to allow distances between the vehicle 1 and objects at the side of the vehicle 1 to be determined. The environment sensor 7 can, in this case, be designed as a radar sensor, a lidar sensor, an ultrasound sensor or an infrared sensor. Moreover, the environment sensor 7 may also comprise a camera that supplies images of the vehicle's environment from which, in particular, it is possible to determine the distance between the vehicle 1 and objects at the side of the vehicle 1.

The control unit 4 is used to perform a parking function on which a parking gap is measured automatically and the vehicle 1 is parked automatically in a parking gap. Preferably, it is foreseen for the vehicle 1 to be steered during the parking maneuver on the basis of control commands of the control unit 4 with the adjusting device 5, and for longitudinal guidance of the vehicle 1, i.e. acceleration and deceleration, to be performed independently by the driver of the vehicle 1 however.

Prior to commencement of the actual parking maneuver, the size of the parking gap and its position relative to the vehicle 1 are initially determined with the environment sensor 7. For this purpose for instance, the distance between the vehicle 1 and objects to the side of the vehicle 1 is determined while driving past the parking gap for instance. The section over which this distance is greater than on the other sections corresponds, in this case, to the lateral demarcation of the parking gap.

Starting from a point in front of the parking gap, the position of the vehicle 1 is determined continuously in a reference system permanently linked to the start point on the basis of the signals of the wheel speed sensors 3*a*, . . . , 3*d* and the signals of the steering angle sensor 6. Knowing the position of the vehicle 1 and on the basis of the distance signals of the environment sensor, it is possible, in this case, to determine the position of the parking gap in the coordinate system.

Consequently, the position of the parking gap relative to a position of the vehicle 1 behind the parking gap at which the vehicle 1 has been stopped by the driver is known. Stopping of the vehicle 1 may, in this case, be done on the basis of a signal triggered by the control unit 4, indicating to the driver that a parking gap of adequate size has been determined. The position assumed is the start position for the parking maneuver controlled by the control unit 4.

The method for parking the vehicle 1 in the parking gap, starting from the start position and foreseen within the framework of the invention, is explained below on the basis of FIG. 2. The Figure shows a schematic diagram of a parking gap 9 whose longitudinal extent (extent in x direction) is demarcated by two vehicles 10, 11. In this case for instance, these may be two vehicles 10, 11 parked at the kerb. Equally, the parking gap 9 may also be demarcated by other obstacles. The vehicle 1 is shown in FIG. 2 in the start position for the parking maneuver.

For this start position, the control unit 4 computes a parking trajectory on which a preset reference point of the vehicle 1 should move into the parking gap 9 during the course of the parking maneuver. The centre point of the rear axle 12 of the vehicle 1 (FIG. 1), referred to as Point A in FIG. 2, is selected as the reference point for instance.

A nominal parking trajectory $y_B(x)$ is determined, within the framework of the invention, using two reference trajectories $y_{Lower}(x)$ and $y_{Upper}(x)$. These are parking trajectories on which the vehicle would be parked on the basis of start points with different lateral distances (i.e. distances in y direction) of the reference point A from the parking gap 9. The reference trajectory $y_{Lower}(x)$ in this case describes a parking trajectory for parking the vehicle starting from a shorter lateral distance than the reference trajectory $y_{Upper}(x)$.

For example, the reference trajectories may be the two parking trajectories with the shortest and the longest lateral distance from the parking gap 9 on which adequately convenient parking in the parking gap 9 is possible. Basically, however, the reference trajectories may be selected at will.

Moreover, within the framework of the invention, it is also possible to use more than two reference trajectories for computing the nominal parking trajectory so as, possibly, to determine an even more convenient nominal parking trajectory. However, it is assumed below by way of example that the nominal parking trajectory is determined on the basis of two reference trajectories.

In this case, the reference trajectories each comprise several trajectory sections, wherein at least two circular arcs (Kr) with opposed curvature and a straight line (G) are foreseen, starting from the parking gap. However, in order to negotiate two circular arcs with opposed curvature, the vehicle must be stopped at the deflection point, i.e. the point at which the circular arcs meet. In addition, the vehicle 1 and its steering are stressed greatly with such a trajectory. Consequently, a double clothoid arc is preferably inserted between the two circular arcs at the deflection point. A further clothoid arc is inserted preferably between the second circular arc and the straight line in order to adapt the curvature of the trajectory to the yaw angle of the vehicle 1.

As shown in FIG. 2, the reference trajectories, starting from the parking gap 9, consequently feature five trajectory sections, wherein the first trajectory section is a circular arc (Kr), the second trajectory section is a clothoid arc (Kl), the third trajectory section is a further circular arc (Kr), the fourth trajectory section is a further clothoid arc (Kl) and the fifth trajectory section is a straight line (G).

The reference trajectories are computed offline—for instance within the framework of a parking maneuver simulation—and are saved in the control unit 4. In this case, it is possible to save reference points for instance within a coordinate system in the control unit 4, the coordinate origin of which is located approximately at one corner point of the parking gap 9. The position of the vehicle 1 determined in a specific coordinate system can be transformed by translation into the system used to define the reference trajectories. Equally, it may also be foreseen for the reference trajectories to be transformed by translation into the coordinate system used for the parking maneuver.

Moreover, it is foreseen for the reference trajectories in the control unit 4 to be referred to the smallest possible parking gap, i.e. the parking gap with the smallest extent in x direction at which parking is just still possible. If a parking gap 9 has a larger longitudinal extent, the reference trajectories are stretched in x direction on the basis of a function that is determined by the longitudinal extent of the available parking gap. In particular, the function indicates a scaling factor for the reference trajectories, wherein the scaling factor does not need to be preset on a uniform basis for an entire trajectory by the function.

Such a scaling corresponds to stretching the reference trajectories in x direction that could, in principle, also be dispensed with. However, stretching results in the maximum steering angles and the maximum steering angle velocity occurring during the parking maneuver being reduced so that the parking maneuver is more convenient for the driver.

Preferably, no scaling or stretching of the reference trajectory furthest from the centre of the roadway with the largest lateral spacing with respect to the parking gap occurs. This is adopted without stretching. In this way, the valid start area between the reference trajectory with the largest lateral distance with respect to the parking gap and the reference trajectory with the shortest lateral distance with respect to the parking gap is increased in size.

Moreover, when stretching the reference trajectories, a check is conducted in order to establish whether the minimum distance between the front, right-hand corner of the vehicle 1 to be parked and the rear left-hand corner of the front parking gap boundary (i.e. the vehicle 11) changes when parking to the right or the minimum distance between the front left-hand corner of the vehicle to be parked and the rear, right-hand corner of the front parking gap boundary changes when parking to the left owing to scaling by comparison with parking in the smallest possible parking gap on the basis of the corresponding nominal parking trajectory. If this check establishes that this minimum distance is reduced, a larger scaling factor is used.

The function specifying the scaling factor is preferably computed offline for different parking gap lengths and saved in the control unit 4 as a function of the longitudinal extent of the available parking gap.

Below, it is assumed that such a scaling of the reference trajectories has been performed. The reference trajectories described below are consequently preferably trajectories scaled in the manner described above.

Preferably, four reference points of the reference trajectories $y_{Lower}(x)$ and $y_{Upper}(x)$ are saved in a memory of the control unit 4. In addition, a nominal yaw angle $\theta_{Lower}(x)$ and a nominal steering angle $\delta_{Lower}(x)$ are saved for each reference point of the lower reference trajectory $y_{Lower}(x)$ and one nominal yaw angle $\theta_{Upper}(x)$ and one nominal steering angle $\delta_{Upper}(x)$ are saved for the reference points of the upper reference trajectory $y_{Upper}(x)$. The scaling of the reference trajectories also results in an adaptation of the nominal yaw angle and of the nominal steering angle referred to the available parking gap.

The nominal parking trajectory for parking is determined in the control unit 4 by an interpolation process on the basis of the two reference trajectories. The following applies in this case to the nominal parking trajectory:

$$y_B(x)=F \cdot y_{Upper}(x)+(1-F) \cdot y_{Lower}(x) \tag{1}$$

The interpolation factor F is determined in such a manner that the nominal parking trajectory $y_B(x)$ contains the Point A with coordinates $(x_A, y_A)$, i.e. $y_B(x_A)=y_A$. Accordingly, the following applies $$F = \frac{y_A - y_{Lower}(x_A)}{y_{Upper}(x_A) - y_{Lower}(x_A)} \tag{2}$$

In this case, it can be demonstrated that the interpolated nominal parking trajectory $y_B(x)$ meets the secondary conditions demanded, in particular the requirements for a constant steering angle characteristic, for non-transgression of a maximum steering angle and a maximum steering angle velocity and for freedom from collision if the state variables of yaw angle and steering angle feature the preset values when negotiating the trajectory.

The nominal yaw angle $\theta_B(x)$ for a specific point of the trajectory is determined by a similar interpolation method to that used for the nominal parking trajectory. In particular, the nominal yaw angle $\theta_B(x)$ at a point $(x, y_B(x))$ of the nominal parking trajectory is given by $$\theta_B(x)=F \cdot \theta_{Upper}(x)+(1-F) \cdot \theta_{Lower}(x) \tag{4}$$

wherein the interpolation factor F corresponds to the interpolation factor determined when computing the nominal parking trajectory.

Similarly, the nominal steering angle $\delta_B(x)$ is determined at a point $(x, y_B(x))$ of the nominal parking trajectory. Within the framework of the invention, it is as follows $$\delta_B(x)=F \cdot \delta_{Upper}(x)+(1-F)\delta_{Lower}(x) \tag{5}$$

wherein F, in turn, is the interpolation factor determined when computing the nominal parking trajectory.

A combination of pilot control function and yaw angle and position control function is performed in order to steer the vehicle along a nominal parking trajectory as accurately as possible and provide the driver with a good steering feel.

The pilot control function is performed by means of a pilot control unit in the control unit 4. In this case, a share of the correcting variable $\delta_{Nominal}$ is determined in each clocking step as a function of a point of the nominal parking trajectory following the current position $(x_A, y_A)$ of the reference point A of the vehicle 1 on the nominal parking trajectory after a given distance of a few centimeters for instance and the nominal yaw angle assigned to this point.

The pilot control function is combined with a position and yaw rate control function. In this case, a further share of the of the nominal steering angle is determined with the position control as a function of a deviation between the current position of the vehicle 1 and the nominal parking curve. In particular, the position control is based on the deviation of the y coordinate of the position $(x_A, y_A)$ of the reference point A of the vehicle 1 from the point $(x_A, y_B(x_A))$ of the nominal parking trajectory. On the basis of the yaw rate control, a share of the nominal steering angle is determined as a function of the deviation between the current yaw angle of the vehicle 1 and the nominal yaw angle that is assigned to the point of the nominal parking trajectory that is adjacent to the current position of the reference point A of the vehicle 1, i.e. the point of the nominal parking trajectory with the same x coordinate as the current position of the reference point A of the vehicle 1. Preferably, P or PI controllers are used for position and yaw rate control.

The various shares of the steering nominal angle are then arbitrated in an appropriate manner, for instance by summing, in order to obtain the correcting variable $\delta_{Nominal}$. The steering angle $\delta_{Nominal}$ is then set by means of the adjusting device 5. The vehicle 1 is then steered into a position in the parking gap 9 in this way.

In general, the actual values of steering angle and yaw angle at the start position do not, however, correspond to the preset nominals. A control unit integrated in the control unit 4 determines the steering angle $\delta_{Nominal}$ that causes the values of the critical state variable of the vehicle 1 to approach the values foreseen for a nominal parking trajectory without having to stop the vehicle after the parking maneuver in order to steer the vehicle 1 in the correct orientation, i.e. with the preset nominal yaw angle and the preset nominal steering angle onto a possible nominal parking trajectory on which it can be steered into the parking gap.

In particular, a so-called anticipatory controller (or "preview controller") is used for this, and its control response is based closely on that of the driver. This means that the corrective interventions are plausible and pleasant for the driver. Moreover, the "Foresight/Preview" and "Gain" controller parameters are simple to apply since, in general, their effects for the driver are known from own driving experience.

The control unit operates preferably on a cyclic basis. In each clocking step, it determines a provisional nominal parking trajectory in the manner described above on the basis of the actual position of the reference point A of the vehicle 1.

Moreover, it determines the deviation of the actual position of the reference point A from the provisional nominal parking trajectory that is anticipated assuming a constant steering angle after a distance of $l_{pre}$, in each clocking step. The anticipated trajectory of the vehicle 1 is a circular arc of length $l_{pre}$, whose radius results from the actual steering angle $\delta$. On the basis of this trajectory, it is possible to compute the anticipated position of the reference point A, wherein the difference between the y coordinate of the anticipated position of the reference point A and the y coordinate $y_A$ of the current position is to be designated dy and the difference between the x coordinate of the anticipated position and the x coordinate $x_A$ of the current position is to be designated dx. If the magnitude of the steering angle $\delta$ in this case is less than a preset threshold value, the differences dx and dy are determined on the basis of the singularity occurring for value $\delta=0$ when computing the circle by linear interpolation.

The anticipated deviation with respect to the provisional nominal parking trajectory $y_B(x)$ is consequently:

$$\Delta Y = y_B(x_A + dx) - y_A - dy \quad (3)$$

Moreover, the yaw angle that is anticipated after distance $l_{pre}$ is computed, i.e. the yaw angle $\theta_{pre}$ that the vehicle 1 has at the point $(x_A+dx, y_A+dy)$ after distance $l_{pre}$, when moving with constant steering angle. In addition, the deviation between the yaw angle $\theta_{pre}$ and the nominal yaw angle $\theta_B(x)$ foreseen for the point $(x_A+dx, y_B(x_A+dx))$ of the provisional nominal parking trajectory is determined. The deviation between the yaw angle $\theta_{pre}$ and the preset yaw angle is $\Delta\theta = \theta_{pre} - \theta_B(x_A+dx)$.

Similarly, a steering angle deviation is determined between the actual steering angle $\delta$ and the nominal steering angle foreseen for the point $(x_A+dx, y_B(x_A+dx))$ of the provisional nominal parking trajectory. The steering angle deviation is given by $\Delta\delta = \delta - \delta_B(x_A+dx)$ in this case.

The magnitudes of the deviations $\Delta Y$, $\Delta\theta$ and $\Delta\delta$ are then compared with one preset threshold value in each case. If one of the magnitudes is greater than the corresponding threshold value, the control function in the control unit 4 determines the correcting variable $\delta_{Nominal}$ in accordance with control law $$\delta_{Nominal} = K_{Preview} \cdot \int \Delta Y \cdot dt \quad (6)$$

wherein $K_{Preview}$ is the gain factor of the anticipatory controller. The steering angle $\delta_{Nominal}$ is set or adjusted with the adjusting unit 5 on the steered wheels 2a, 2b.

Preferably, it is foreseen that the magnitude of variable $K_{preview} \cdot \Delta Y$ is limited at the start of the parking maneuver and that the possible values are incremented with increasing distance traveled during the parking maneuver until no further limitation occurs after a preset distance. The maximum magnitudes are preset in this case as a function of the distance traveled in the form of a ramp function.

The provisional nominal parking trajectory is re-computed in each clocking step of the control unit 4 on the basis of the current position $(x_A, y_A)$ of the reference point A of the vehicle 1 from the reference trajectories $y_{Lower}$ and $y_{Upper}$ if the difference $y_{Upper}(x_A) - y_{Lower}(x_A)$ is not less than a threshold value. If this is the case, the provisional nominal parking trajectory $y_B(x)$ is preferably not re-computed. This allows numerical problems to be avoided.

Moreover, the magnitudes of the deviations $\Delta Y$, $\Delta\theta$ and $\Delta\delta$ are compared in each clocking step with the threshold values assigned to them. If one of these magnitudes is greater than the corresponding threshold value, the steering angle control function is performed, as described above, on the basis of the control law stated in equation 6.

However, if it is established in a clocking step that the magnitudes of deviations $\Delta Y$, $\Delta\theta$ and $\Delta\delta$ are less than the corresponding threshold values, change-over is made in the steering angle control from anticipatory control to the above described combination of pilot control, yaw angle control and position control. The provisional nominal parking trajectory computed beforehand $y_B(x)$ is no longer changed in this case but this trajectory is used as the nominal parking trajectory in pilot control. The vehicle is then steered into the parking gap on this nominal parking trajectory.

In principle, a nominal parking trajectory can be computed or interpolated from the reference trajectories for every possible start position of the vehicle 1 with the method outlined above. However, it is not possible to steer the vehicle 1 into the parking gap 9 without collision for each start position. Consequently, within the framework of the invention, it is foreseen that the negotiability of the parking gap 9 be determined prior to the start of the parking maneuver, this being explained below with reference to FIG. 3.

In this case, it may be foreseen that a check is initially conducted in order to establish whether the parking gap is negotiable without collision starting from the start position, at the start of the parking maneuver commenced by the driver.

A further embodiment of the present invention may foresee the driver being informed continuously, after passing the parking gap, whether the vehicle 1 is in a position from which the parking gap is negotiable. If the driver, on the basis of this notification, recognises that the vehicle 1 is in such a position, he or she can stop the vehicle 1 and start the parking maneuver.

In one preferred embodiment of the invention in this case, the negotiability of the parking gap 9 is determined on the basis of two characteristic diagram $y_{min}(\delta, \theta, x_A)$ and $y_{max}(\delta,$ $\theta$, $x_A$). The characteristic diagram $y_{min}$ ($\delta$, $\theta$, $x_A$) in this case indicates the lower limit and the characteristic diagram $y_{max}$ ($\delta$, $\theta$, $x_A$) indicates the upper limit for the y coordinate of the reference point A of the vehicle 1 for which parking at a given steering angle $\delta$ and at a given yaw angle $\theta$ of the vehicle 1 and a given x coordinate of the reference point A of the vehicle 1 is possible.

Figure 3:
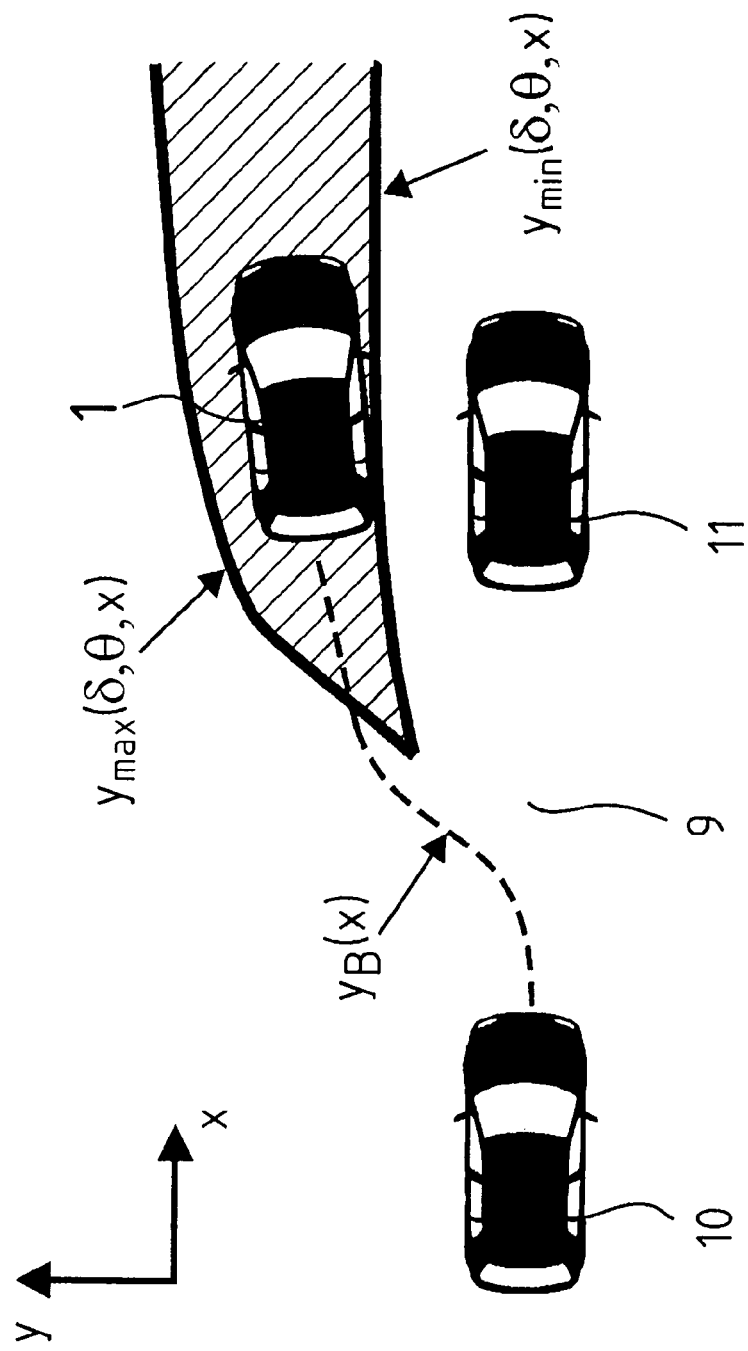
FIG. 3 a schematic representation of a nominal parking trajectory for a parking maneuver and two characteristic maps that delimit a valid range of possible start points for the parking maneuver.

For a given yaw angle and given steering angle, the characteristic diagram $y_{min}$ ($\delta$, $\theta$, $x_A$) and $y_{max}$ ($\delta$, $\theta$, $x_A$) consequently delimit a valid range of possible start points for the parking maneuver that is shown on the basis of a hatched area in FIG. 3.

The characteristic diagram $y_{min}$ ($\delta$, $\theta$, $x_A$) and $y_{max}$ ($\delta$, $\theta$, $x_A$) are saved in the control unit 4, wherein one value $y_{min}$ and $y_{max}$ is saved for various combinations of discrete values for the steering angle $\delta$, the yaw angle $\theta$ and the x coordinate of the reference point A of the vehicle 1 in each case. Consequently, this produces a grid of characteristic diagram points in a ($\delta$, $\theta$, $x_A$) space in which there is one value saved for $y_{min}$ and one value saved for $y_{max}$ in the control unit 4 for each characteristic diagram point.

It can be demonstrated that the parking gap 9 is negotiable if there is a value triple ($\delta$, $\theta$, $x_A$) of the values for the yaw angle, the steering angle and the x coordinate of the reference point A of the vehicle 1 for all lateral distances $y_A$ of the reference point A of the vehicle 1 from the parking gap 9 lying between $y_{min}$ and $y_{max}$.

However, it is equally possible, within the framework of the invention, to use other characteristic diagrams as described in further detail further below in place of the characteristic diagrams $y_{min}$ ($\delta$, $\theta$, $x_A$) and $y_{max}$ ($\delta$, $\theta$, $x_A$).

The characteristic diagrams saved in the control unit 4, in turn, relate to the smallest possible parking gap. If the parking gap has a larger longitudinal extent, the characteristic diagrams are scaled on their x coordinate analogously to scaling of the reference trajectories. The scaling factor in this case is, in turn, preset as a function of the longitudinal extent of the available parking gap 9, wherein it may be foreseen, as is the case when scaling the reference trajectories, that scaling can be performed on the basis of the function in various areas of the x coordinates of the characteristic diagrams in different ways.

Equally, in one embodiment of the invention, it is possible for the determined position of vehicle 1 or of the reference point A to be transformed onto the coordinate system in which the characteristic diagrams and reference trajectories are defined by scaling the x coordinate of the reference point A. Moreover, the determined yaw angle of the vehicle is also transformed onto this coordinate system in the manner already explained. The scaling factor for scaling the x coordinate is determined in the manner described above.

Below, it is assumed that such scaling of the x coordinate of the reference point A of the vehicle 1 and of the yaw angle has been performed or that the characteristic diagrams have been scaled in the manner outlined.

In order to determine the negotiability of the parking gap 9, a check is conducted, for the actual steering angle $\delta$, the actual yaw angle $\theta$ and the x coordinate determined for the reference point A of the vehicle 1, in order to establish whether the condition $$y_{min}(\delta,\theta,x_A) \leq y_A \leq y_{max}(\delta,\theta,x_A)$$

is met for the y coordinate of the reference point A. If this is the case, the negotiability of the parking gap 9 is determined and signalled to the driver. If the condition is not met, it is determined that the parking gap is non-negotiable, starting from the actual position of the vehicle 1.

In general, the available value triple ($\delta$, $\theta$, $x_A$) will not, however, correspond to a value triple saved in the control unit 4. The value triple saved in the control unit 4 and to be used for the check is determined in this case, within the framework of the invention, in a further approach, wherein the "worst" neighbouring value triple saved in the control unit 4 is determined for a value triple ($\delta$, $\theta$, $x_A$) with the values present in the current state of the vehicle 1.

In this case, the neighbouring value triples are first determined for the actual value triple ($\delta$, $\theta$, $x_A$), i.e. the value triples whose individual values lie adjacent to the actual values of the corresponding variables. The values $y_{min}$ and $y_{max}$ assigned to the determined value triples are then determined. A check is then conducted in order to establish whether the actual y coordinates of the reference point A of the vehicle 1 are less than one of the determined $y_{min}$ values or greater than one of the $y_{max}$ values determined. If this is the case, it is determined that the parking gap is non-negotiable. If this is not the case, it is ascertained that the parking gap is negotiable, starting from the actual position of the vehicle 1.

For the purposes of determining the characteristic diagrams $y_{min}$ ($\delta$, $\theta$, x) and $y_{max}$ ($\delta$, $\theta$, x), the start area is discretised with the possible start position for a parking maneuver, i.e. a grid of points of the start area is defined. The parking maneuver is then simulated for the grid points for various yaw angles $\theta$ and steering angles $\delta$ in order to check whether parking is possible. This makes it possible to obtain a four-dimensional characteristic diagram f($\delta$, $\theta$, $x_A$, $y_A$) in which all possible combinations of the start values ($\delta$, $\theta$, $x_A$, $y_A$) are specified for which a parking maneuver is possible. On the basis of the characteristic diagram f($\delta$, $\theta$, $x_A$, $y_A$), it is then possible to determine the characteristic diagrams $y_{min}$ ($\delta$, $\theta$, $x_A$) and $y_{max}$ ($\delta$, $\theta$, $x_A$) that are saved in the control unit 4.

However, as previously mentioned, other characteristic diagrams may also be used to determine the negotiability of the parking gap 9, and these can also be determined from the characteristic diagram f($\delta$, $\theta$, $x_A$, $y_A$). Basically, any characteristic diagrams $z_{1,min}$ ($z_2$, $z_3$, $z_4$) and $z_{1,max}$ ($z_2$, $z_3$, $z_4$) with $z_i \in \{\delta, \theta, x_A, y_A\}$ differing in pairs that specify a minimum value $z_{1,min}$ resp. a maximum value $z_{1,max}$ of a second vehicle variable $z_1$ for given sets ($z_2$, $z_3$, $z_4$) of values of initial vehicle variables. The negotiability of the parking gap 9 is ascertained in this case if the following applies to the value of $z_1$ with given values of $z_2$, $z_3$ and $z_4$:

$$z_{1,min}(z_2,z_3,z_4) \leq z_1 \leq z_{1,max}(z_2,z_3,z_4)$$

One specific example of other possible characteristic diagrams in this case comprises the characteristic diagrams $\theta_{min}$ ($\delta$, $x_A$, $y_A$) and $\theta_{max}$ ($\delta$, $x_A$, $y_A$) that each state a minimum value $\theta_{min}$ ($\delta$, $x_A$, $y_A$) and a maximum value $\theta_{max}$ ($\delta$, $x_A$, $y_A$) for the yaw angle $\theta$ of the vehicle 1 for given value triples ($\delta$, $x_A$, $y_A$).

Basically, it would also be possible to ascertain the negotiability of the parking gap 9 on the basis of the characteristic diagram f($\delta$, $\theta$, $x_A$, $y_A$). However, this would cover substantially more reference points than the two characteristic diagrams specifying a minimum and a maximum value for a vehicle variable with the same coverage of the valid range. Consequently, using two characteristic diagrams allows a substantial saving on memory space in the control unit 4.

As already mentioned, one embodiment of the invention foresees a check being conducted after passing the parking gap in clocking steps of a preset clocking duration, i.e. for consecutive points of the trajectory of the vehicle or of the reference point A of the vehicle, in order to establish whether the actual position of the vehicle 1 allows parking in the parking gap 9. The duration in this case is preferably selected in such a manner that a quasi-continuous check of the negotiability of the parking gap 9 is conducted.

In one advantageous further development of the invention, it is foreseen that, after exiting the valid area specified by the characteristic diagrams, the trajectory of the reference point A of the vehicle 1 and the steering angles set at each of the trajectory points by the driver be saved in the control unit 4. This allows the trajectory to be traced back into the valid range after the start of the parking maneuver at a start point outside of the valid range. The valid range is thus extended. In particular, this allows undercutting or parking on inside curves to be allowed for since the trajectory was already negotiated once and it is free of obstacles assuming stationary conditions.

In this embodiment of the present invention, it is not indicated to the driver that the parking gap 9 is non-negotiable after the vehicle 1 has reached the valid range. Rather, the driver is able to start the parking maneuver even outside of the valid range. After the parking maneuver has been started, the vehicle 1 is then steered back into the valid range on the basis of the saved trajectory points and the related steering by the control unit 4. For this purpose, the control unit 4 transmits adjusting commands to the adjusting device 5 with which the steering angle saved previously for this trajectory point is set at each trajectory point. After the vehicle 1 has returned to the valid range in this way, the parking maneuver can be performed in the above-described manner.

The invention claimed is:

1. A method for steering a vehicle into a parking gap, the method comprising:
   determining a nominal parking trajectory of the vehicle (1); and
   determining a steering angle of steered wheels of the vehicle, wherein the steering angle can be set for negotiating the parking gap (9) on the basis of the nominal parking trajectory, wherein the nominal parking trajectory ($y_B(x)$) is determined from two reference trajectories ($y_{Lower}(x)$; $y_{Upper}(x)$) on the basis of a position of the vehicle, wherein the reference trajectories ($y_{Lower}(x)$; $y_{Upper}(x)$) represent parking trajectories for parking, starting from different start points.

2. The method of claim 1, wherein the determination of the nominal parking trajectory is done by a control unit and the reference trajectories ($y_{Lower}(x)$; $y_{Upper}(x)$) are saved in the control unit (4).

3. The method of claim 2, wherein the reference trajectories ($y_{Lower}(x)$; $y_{Upper}(x)$) saved in the control unit (4) refer to parking in a parking gap with the smallest possible longitudinal extent for negotiability and at least one reference trajectory ($y_{Lower}(x)$; $y_{Upper}(x)$) is adapted to the available parking gap (9).

4. The method of claim 3, wherein adaptation is performed using a scaling factor by stretching the reference trajectory ($y_{Lower}(x)$; $y_{Upper}(x)$) in the direction of the longitudinal extent of the parking gap (9).

5. The method of claim 4, wherein the scaling factor is determined from a ratio of the longitudinal extent of the available parking gap (9) and the longitudinal extent of the parking gap with the smallest possible longitudinal extent for negotiability.

6. The method of claim 4, wherein the scaling factor is preset as a function of the longitudinal extent of the available parking gap (9).

7. The method of claim 4, wherein the reference trajectory ($y_{Upper}(x)$) that contains a start point with the longest lateral distance with respect to the parking gap is adopted without stretching while the other reference trajectories are adapted using the scaling factors by stretching to the available parking gap (9).

8. The method of claim 1, wherein the reference trajectories ($y_{Lower}(x)$; $y_{Upper}(x)$) correspond to parking trajectories that contain start points with different lateral distances from the parking gap (9).

9. The method of claim 1, wherein the nominal parking trajectory ($y_B(x)$) is determined from the reference trajectories in such a manner that a point of the nominal parking trajectory ($y_B(x)$) corresponds to a position of a preset reference point (A) of the vehicle (1).

10. The method of claim 1, wherein the nominal parking trajectory ($y_B(x)$) results from an addition of the reference trajectories each multiplied by a factor ($y_{Lower}(x)$; $y_{Upper}(x)$).

11. The method of claim 1, wherein the nominal parking trajectory $Y_B(x)$ is computed in the form $y_B(x)=F \cdot y_{Upper}(x)+(1-F) \cdot y_{Lower}(x)$ from an initial reference trajectory $y_{Upper}(x)$ and a second reference trajectory $y_{Lower}(x)$, wherein x is a coordinate on a coordinate axis orientated in a longitudinal direction of the parking gap and F is an interpolation factor.

12. The method of claim 1, wherein the reference trajectories ($y_{Lower}(x)$, $y_{Upper}(x)$) comprise several sections, wherein the last four sections in a travel direction are a clothoid section (KI), a circular arc section (Kr), a further clothoid section (KI) and a further circular arc section (Kr).

13. The method of claim 12, wherein the reference trajectories ($y_{Lower}(x)$, $y_{Upper}(x)$) comprise five sections, wherein the first section in the travel direction is a straight section (G).

14. The method of claim 1, wherein points of the nominal parking trajectory ($y_B(x)$) are each assigned a yaw nominal angle ($\theta_B(x)$) of the vehicle (1).

15. The method of claim 14, wherein for each point of the reference trajectories ($y_{Lower}(x)$; $y_{Upper}(x)$) one yaw angle ($\theta_{Lower}(x)$; $\theta_{Upper}(x)$) is saved in a control unit (4) and a nominal yaw angle ($\theta_B(x)$) that is assigned to a point of the nominal parking trajectory ($y_B(x)$) is determined from the yaw angles ($\theta_{Lower}(x)$; $\theta_{Upper}(x)$) that are saved for points of the reference trajectories ($y_{Lower}(x)$; $y_{Upper}(x)$).

16. The method of claim 1, wherein points of the nominal parking trajectory ($y_B(x)$) are each assigned a nominal steering angle ($\delta_B(x)$).

17. The method of claim 16, wherein for each of the points of the reference trajectories ($y_{Lower}(x)$; $y_{Upper}(x)$) one steering angle ($\delta_{Lower}(x)$; $\delta_{Upper}(x)$) is saved in a control unit (4) and that the nominal steering angle ($\delta_B(x)$) that is assigned to a point of the nominal parking trajectory ($y_B(x)$) is determined from the steering angles ($\delta_{Lower(x)}$; $\delta_{Upper}(x)$) that are saved for points of the reference trajectories ($y_{Lower(x)}$; $y_{Upper}(x)$).

18. The method of claim 1, wherein the steering angle ($\delta_{Nominal}$) to be set for negotiating the parking gap (9) is determined on the basis of a pilot control function, wherein a share of the steering angle ($\delta_{nominal}$) is determined on the basis of the pilot control function as a function of a point of the nominal parking trajectory ($y_B(x)$) following an actual position of the vehicle (1) on the nominal parking trajectory ($y_B(x)$) after a given distance and a nominal yaw angle ($\theta_B(x)$) assigned to this point.

19. The method of claim 18, wherein the pilot control function is combined with a position control, wherein a share of the steering angle ($\delta_{nominal}$) to be set for negotiating the parking gap (9) is determined as a function of a deviation between the actual position of the vehicle (1) and the nominal parking trajectory ($y_B(x)$).

20. The method of claim 18, wherein the pilot control function is combined with a yaw angle control, a share of the steering angle ($\delta_{nominal}$) to be set for negotiating the parking gap (9) is determined as a function of a deviation between a actual yaw angle of the vehicle (1), and a nominal yaw angle ($\theta_B(x)$) that is assigned to a point of the nominal parking trajectory ($y_B(x)$) adjacent to the actual position of the vehicle (1).

21. The method of claim 20, wherein starting from a start point, the vehicle is initially steered onto the nominal parking trajectory ($y_B(x)$) on the basis of an anticipatory control function and the pilot control function is run afterwards.

22. The method of claim 20, wherein the steering angle ($\delta_{nominal}$) to be set for negotiating the parking gap is determined on the basis of an anticipatory control function as a function of the deviation ($\Delta Y$) between an anticipated position of the vehicle (1) after negotiating a preset distance ($I_{Pre}$) starting from an actual position of the vehicle assuming a constant steering angle during negotiation of the distance and a provisional nominal parking trajectory ($y_B(x)$).

23. The method of claim 22, wherein the deviation corresponds to a distance measured in a transverse direction with respect to the parking gap (9) between the anticipated position of a preset reference point (A) of the vehicle (1) and the provisional nominal parking trajectory ($y_B(x)$).

24. The method of claim 22, wherein the provisional nominal parking trajectory is determined from the reference trajectories on the basis of the actual position of the vehicle.

25. The method of claim 22, wherein the steering angle $\delta_{Nominal}$ to be set for negotiating the parking gap is determined with the anticipatory control function on the basis of the relationship $\delta_{Nominal} = K_{Preview} \cdot \int \Delta Y \cdot dt$, wherein $K_{Preview}$ describes a gain factor, $\Delta Y$ describes a distance measured in a transverse direction with respect to the parking gap (9) between the anticipated position of the preset reference point (A) of the vehicle (1) and the provisional nominal parking trajectory ($y_B(x)$) and t describes a time variable.

26. The method of claim 22, wherein the pilot control function is run after it has been established that the magnitude of a deviation between an anticipated yaw angle ($\theta_{pre}$) of the vehicle (1) after negotiating the preset distance ($I_{pre}$) and a nominal yaw angle ($\theta_B(x)$) that is assigned to a point of the provisional nominal parking trajectory ($y_B(x)$) adjacent to the anticipated position of the vehicle (1) after negotiating the preset distance is less than a preset threshold value.

27. The method of claim 22, wherein the pilot control function is run after it has been established that the magnitude of the deviation between the actual steering angle at the steered wheels of the vehicle and a nominal steering angle ($\delta_B(x)$) that is assigned to a point of the provisional nominal parking trajectory ($y_B(x)$) adjacent to the anticipated position of the vehicle (1) after negotiating the preset distance is less than a preset threshold value.

28. The method of claim 22, wherein the nominal parking trajectory ($y_B(x)$) corresponds to the provisional nominal parking trajectory ($y_B(x)$) determined directly prior to a switchover to the pilot control function.

29. The method of claim 22, wherein the determination of a nominal parking trajectory is done by a control unit (4) operating cyclically and a provisional nominal parking trajectory ($y_B(x)$) is determined in each clocking step on the basis of the current actual position of the vehicle (1) from the reference trajectories ($y_{Lower}(x); y_{Upper}(X)$).

30. A parking assist device for steering a vehicle to be parked into a parking gap, comprising:
a control unit which determines a nominal parking trajectory of the vehicle and a steering angle of steered wheels of the vehicle that can be set for negotiating the parking gap on the basis of the nominal parking trajectory, wherein the nominal parking trajectory ($y_B(X)$) is determined on the basis of a position of the vehicle from two reference trajectories ($Y_{Lower}(X); Y_{Upper}(X)$), wherein the reference trajectories ($y_{Lower}(X); Y_{upper}(X)$) represent parking trajectories for parking, starting from different start points.

* * * * *